United States Patent
Parthasarathy et al.

(10) Patent No.: US 10,331,633 B2
(45) Date of Patent: Jun. 25, 2019

(54) SCHEMA DISCOVERY THROUGH STATISTICAL TRANSDUCTION

(71) Applicant: INTERNATIONAL BUSINESS MACHINES CORPORATION, Armonk, NY (US)

(72) Inventors: Srinivasan Parthasarathy, Yonkers, NY (US); Venkata N. Pavuluri, New Rochelle, NY (US); Deepak S. Turaga, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 509 days.

(21) Appl. No.: 14/730,287

(22) Filed: Jun. 4, 2015

(65) Prior Publication Data

US 2016/0357747 A1  Dec. 8, 2016

(51) Int. Cl.
*G06F 16/21* (2019.01)
*G06F 17/27* (2006.01)

(52) U.S. Cl.
CPC ........ *G06F 16/211* (2019.01); *G06F 17/2705* (2013.01); *G06F 17/2785* (2013.01)

(58) Field of Classification Search
CPC ........... G06F 17/3053; G06F 17/30958; G06F 17/2705; G06F 17/30292
USPC ....................................................... 707/748
See application file for complete search history.

(56) References Cited

U.S. PATENT DOCUMENTS

| | | | |
|---|---|---|---|
| 7,353,226 B2 | 4/2008 | Coen et al. | |
| 7,444,330 B2 | 10/2008 | Bernstein et al. | |
| 7,849,048 B2 | 12/2010 | Langseth et al. | |
| 8,195,693 B2 | 6/2012 | Syeda-Mahmood | |
| 8,577,857 B2 | 11/2013 | Nikovski | |
| 8,676,866 B2 | 3/2014 | Lemcke et al. | |
| 8,868,482 B2 | 10/2014 | Murthy | |
| 2003/0149698 A1 | 8/2003 | Hoggatt | |
| 2005/0198073 A1 | 9/2005 | Becks et al. | |
| 2012/0072391 A1* | 3/2012 | Simitsis | ............... G06Q 10/103 707/602 |

(Continued)

OTHER PUBLICATIONS

Zhang, Wei, "Efficient XML Stream Processing and Searching", The Florida State University College of Arts and Science, A Dissertation submitted to the Department of Computer Science, Mar. 22, 2012, pp. 1-165.*

(Continued)

*Primary Examiner* — Pierre M Vital
*Assistant Examiner* — Alicia M Antoine
(74) *Attorney, Agent, or Firm* — Law Office of Jim Boice

(57) ABSTRACT

A method, system, and computer program product derive data schema for application to a data set. One or more processors generate a directed acyclic weighted graph that encodes data types and semantic types used by a data set. One or more processors assign estimated frequencies for each component of the directed acyclic weighted graph, where the estimated frequencies predict a likelihood of a particular data schema element being used by any data set. One or more processors traverse through paths in the directed acyclic weighted graph with a predetermined portion of the data set to determine a data schema that correctly defines data from the data set and identifies any errors in the data set, and then apply the data schema to the data set to generate clean data that is properly formatted.

16 Claims, 7 Drawing Sheets

(56) References Cited

U.S. PATENT DOCUMENTS

| | | | | |
|---|---|---|---|---|
| 2015/0039651 A1* | 2/2015 | Kinsely | ............ | G06F 17/30563 |
| | | | | 707/779 |
| 2015/0242408 A1* | 8/2015 | Frohock | ............ | G06F 17/30345 |
| | | | | 707/749 |
| 2016/0224899 A1* | 8/2016 | Nguyen | ................. | G06N 7/005 |
| 2016/0232032 A1* | 8/2016 | Azvine | ................. | G06F 9/542 |
| 2016/0239660 A1* | 8/2016 | Azvine | ............ | G06F 17/30961 |
| 2016/0300126 A1* | 10/2016 | Callan | ................. | G06K 9/6284 |

OTHER PUBLICATIONS

Watson, Rebecca F., "Optimizing the Speed and Accuracy of a Statistical GLR Parser", Technical Report, University of Cambridge Computer Laboratory, Mar. 2009, pp. 1-143.*

Sagi, Tomer, and Avigdor Gal. "Schema matching prediction with applications to data source discovery and dynamic ensembling." The VLDB Journal—The International Journal of Very Large Data Bases 22.5 (2013): 68-710.

\* cited by examiner

SCHEMA DISCOVERY THROUGH STATISTICAL TRANSDUCTION

STATEMENT REGARDING FEDERALLY SPONSORED RESEARCH OR DEVELOPMENT

This invention was made with Government support under Contract No. H98230-14-D-0038 awarded by the U.S. Department of Defense. The Government has certain rights in this invention.

BACKGROUND

The present disclosure relates to the field of computers, and specifically to computers that utilize data sets. Still more particularly, the present disclosure relates to schema used by data sets in a database.

A database schema of a database system is the structure used by a database management system. The database schema itself refers to how the database is constructed according to certain rules/parameters, often called formals, which are data constraints that are imposed on the database. By following a consistent database schema, different sets of data are properly organized within the database system.

SUMMARY

A method, system, and/or computer program product derive data schema for application to a data set. One or more processors generate a directed acyclic weighted graph that encodes data types and semantic types used by a data set. One or more processors assign estimated frequencies for each component of the directed acyclic weighted graph, where the estimated frequencies predict a likelihood of a particular data schema element being used by any data set. One or more processors traverse through paths in the directed acyclic weighted graph with a predetermined portion of the data set to determine a data schema that correctly defines data from the data set and identifies any errors in the data set, and then apply the data schema to the data set to generate clean data that is properly formatted.

DETAILED DESCRIPTION

Figure 1:
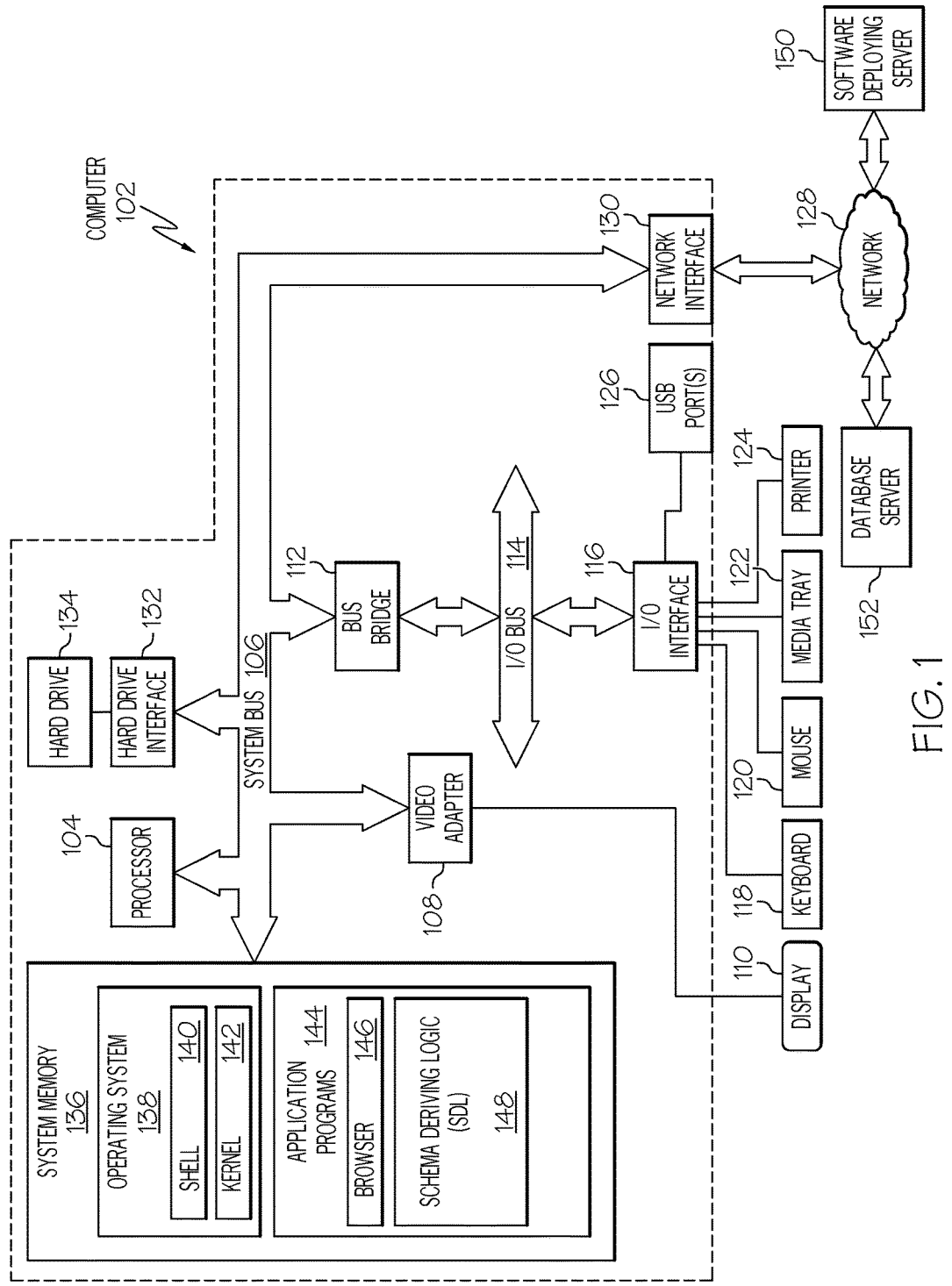
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or database server 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a schema deriving logic (SDL) 148.

SDL 148 includes code for implementing the processes described below, including those described in FIGS. 2-5. In one embodiment, computer 102 is able to download SDL 148 from software deploying server 150, including in an on-demand basis, wherein the code in SDL 148 is not downloaded until needed for execution. In one embodiment of the present invention, software deploying server 150 performs all of the functions associated with the present invention (including execution of SDL 148), thus freeing computer 102 from having to use its own internal computing resources to execute SDL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
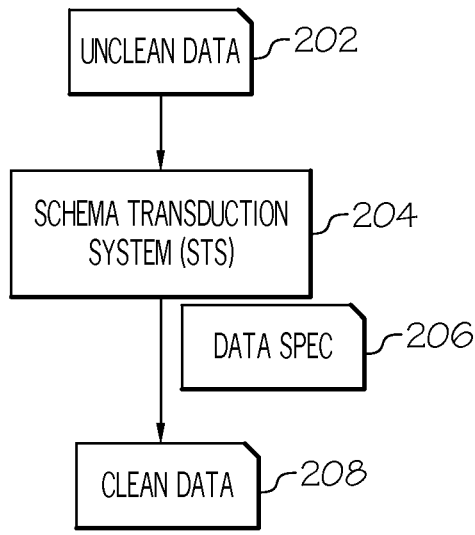
FIG. 2 illustrates a high-level overview of transforming unclean data into clean, properly formatted data, using the present invention.

With reference now to FIG. 2, a high-level overview of transforming unclean data into clean, properly formatted data, using the present invention is presented. As shown in FIG. 2, unclean data 202 (i.e., data that is either unformatted or is in an incorrect format schema) is converted into clean data 208 that is properly formatted using the appropriate schema. This transformation occurs by application of a schema transduction system (STS) 204, which executes the SDL 148 in FIG. 1 to implement the statistical transducer shown in FIG. 4, in order to identify/define the appropriate data specification 206 (i.e., data schema) needed to properly organize the unclean data 202 into the clean data 208.

Figure 3:
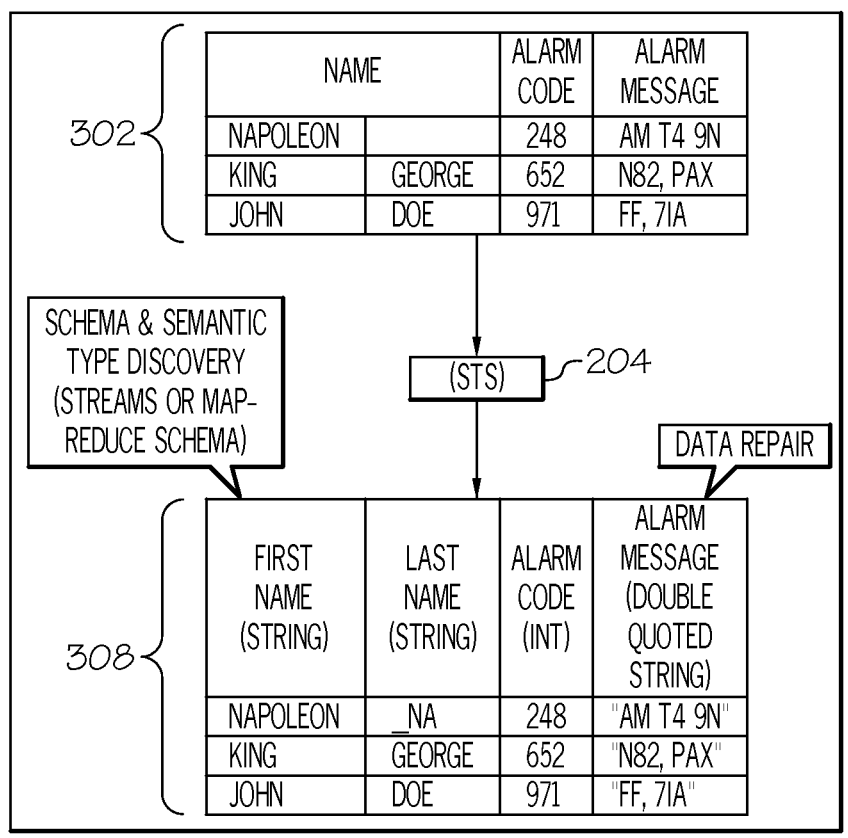
FIG. 3 depicts an exemplary use case of the process shown in FIG. 2.

For example, consider FIG. 3, which depicts an exemplary use case of the process shown in FIG. 2. Unclean data 302 (analogous to unclean data 202 in FIG. 2) contains the names of various persons, alarm codes (e.g., identifiers for certain types of alarms, such as "Unregistered person" or "Do not share this person's data" or "Send a message to a security administrator if this person attempts to use his/her credit card", etc.). The alarm code is linked to a particular alarm message, which instructs a system (e.g., a customer database security system) to perform a particular action.

Unclean data 302 is not initially usable by the system, since the system requires the data 302 to be in a particular data schema (i.e., format) in order to be usable. That is, a data schema defines the name and attributes of entities from a data source. The data schema defines naming protocols of the data, conventions for locating the data, definitions of the data type (e.g., string, integer, floating point, etc.). The STS 204 introduced in FIG. 2 converts unclean data 302 into clean data 308 (analogous to clean data 208 in FIG. 2). Thus, the data names are now formatted into first and last name strings, the alarm codes are defined as being integers, and the alarm messages are formatted as double quoted (left and right) strings. The security system is now able to utilize the clean data 308.

In order to decide which data schema to apply to unclean data 202/302 to create clean data 208/308, the present invention utilizes statistical transduction of other data sets that have similar properties as unclean data 202/302 to determine which data schema should be applied to unclean data 202/302 in order to create clean data 208/308. That is, assume that numerous other data sets also contain the names of persons, alarm codes, and alarm messages, as shown in FIG. 3. Assume further that a new data set also contains the names of persons, alarm codes, and alarm messages, thus inferring that the new data set is similar to the other data sets. However, assume further that the other data sets do not have defined data schema, even though they may be organized in a certain data schema. That is, the other data sets may be using a particular schema, even though this is not explicitly defined. Thus, the present invention extracts schema indicators from the other data sets, in order to define the data schema that is being used. This schema indicator extraction is performed by a statistical transducer.

For the purposes of the present invention, a statistical transducer is defined as a statistically-weighted computer-implemented process for observing and extracting the schematic traits of a set of data, in order to extract/determine the data schema being used by that set of data.

Figure 4:
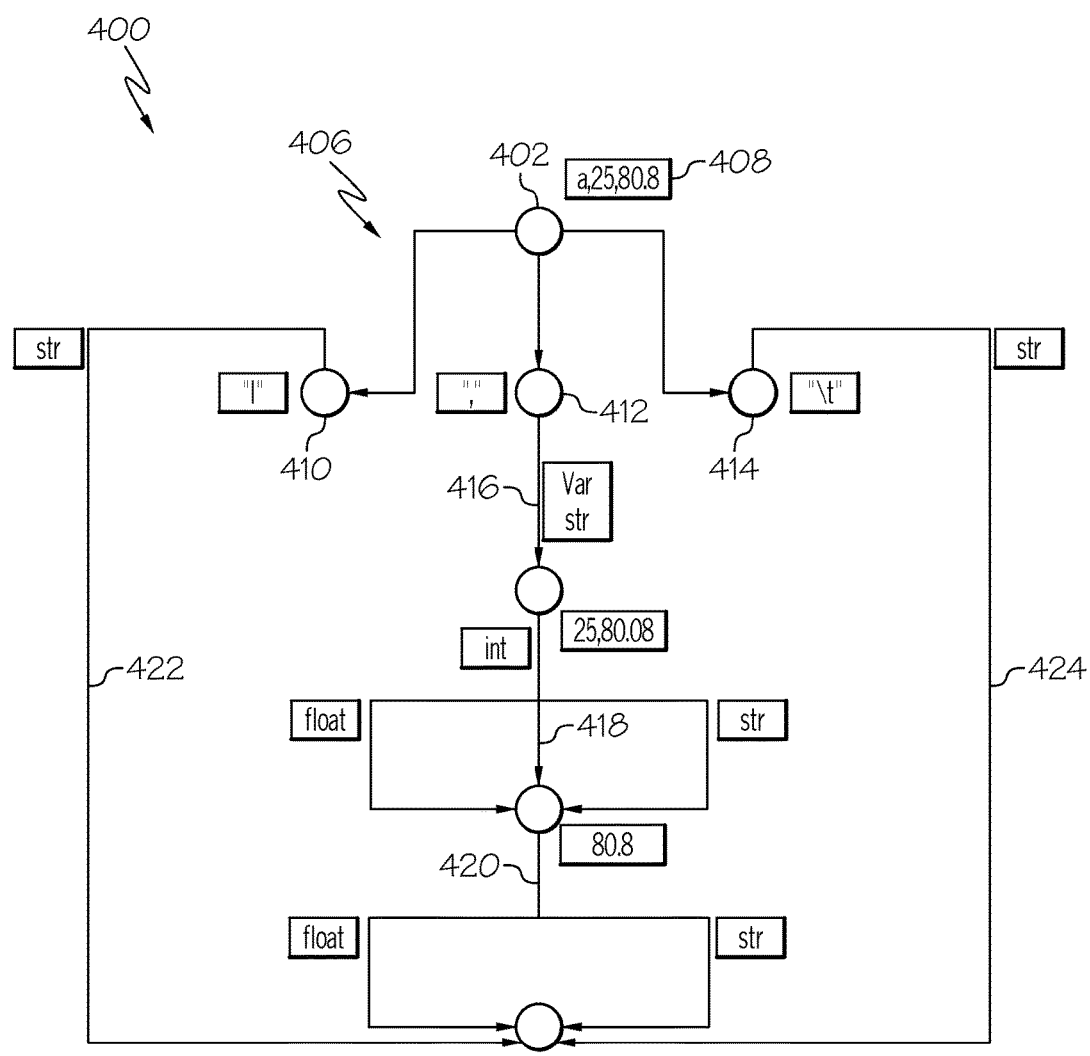
FIG. 4 illustrates a constructed statistical transducer in accordance with one or more embodiments of the present invention.

In FIG. 4, an exemplary statistical transducer is shown as a directed acyclic weighted graph 400. As indicated by its name, directed acyclic weighted graph 400 is a "directed graph" made up of nodes, which are connected by edges that have a direction associated with them. For example, node 402 is connected to node 410 by directed edge 406, allowing travel from node 402 to node 410, but not from node 410 to node 402. Since no pathway allows travel from any particular node (e.g., node 402) back to that same node, the directed graph is defined as being "acyclic".

In one embodiment, STS 204 uses a GLR parser to evaluate data set 408. A GLR parser examines a data set from Left to Right (thus the "LR" in "GLR") in a Generalized manner (i.e., can be used with any data set, and thus the "G"), thereby being able to handle unclean data whose data schema has not been formally identified/determined in a systematic manner.

As shown in FIG. 4, data set 408 is (a,25,80.8). In order to determine what data schema is being used, data separators are extracted. Possible data separators that a data set could use include tabs ("/t"), pipe characters ("|"), and commas (","). Commas are used by the CSV ("commas separated values") data schema.

The directed acyclic weighted graph 400 is initially generated with first tier nodes 410, 412, and 414, thus respectively covering the schemas that use pipes, commas, and tabs to separate data. The STS 204 described above examines data set 408 and finds no pipes or tabs, and therefore does not traverse through nodes 410 or 414. However, a comma is found in data set 408, indicating the use of the CSV data schema, thus causing the STS 204 to traverse through node 412.

In FIG. 4, the leftmost element from data set 408 is the variable "a", which is identified by edge 416 as a variable string, leading to the determination of one feature of the schema used by data set 408.

Thereafter, edge 418 identifies the next element in data set 408 ("25") as being an integer. More specifically, edge 418 determines that the next element is a string integer (i.e., has no decimal point).

Thereafter, edge 420 identifies the next element in data set 408 ("80.8") as being an floating point integer (i.e., has a decimal point).

Thus, the directed acyclic weighted graph 400 allows the STS 204 to identify the schema used by data set 408 as a 3-tuple that uses the CSV data schema, and in which the first element in the 3-tuple is a variable, the second element in the 3-tuple is an integer, and the third element in the 3-tuple is a floating point number.

Thereafter, directed acyclic weighted graph 400 can be pruned back to eliminate the pathways 422 and 424, since there are no post or tab dividers for the data in a data set such as data set 408. Thus, if another similar data set is evaluated to determine its data schema, pathways 422 and 424 would not be part of the newly revised version of directed acyclic weighted graph 400. This "other similar data set" would be one that meets some criteria/rule as being similar to data set 408. For example, if the other similar data set came from a same user or application or enterprise as the entity that produced the data set 408, then an assumption can be made that "unclean data" from that entity should be using the same data schema as that used by data set 408.

Figure 5:
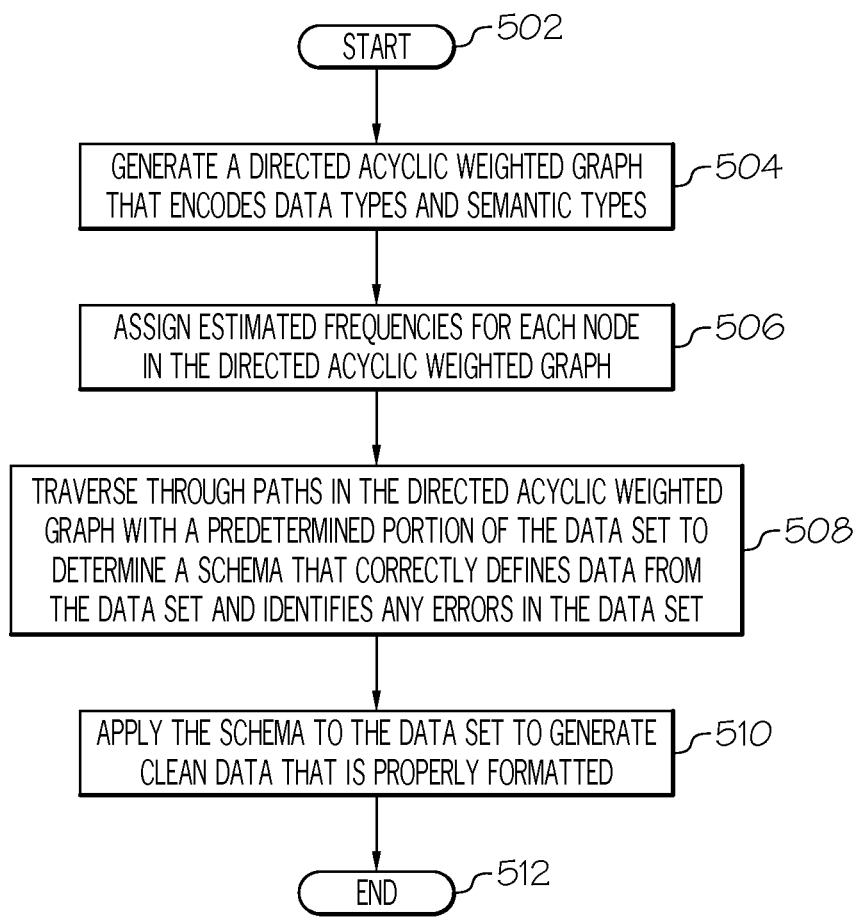
FIG. 5 is a flow chart of one or more steps performed by a processor to derive data schema from a directed acyclic weighted graph for application to a data set.

With reference now to FIG. 5, a flow chart of one or more steps performed by a processor to derive data schema from a directed acyclic weighted graph for application to a data set is presented.

After initiator block 502, one or more processors generate a directed acyclic weighted graph (e.g., directed acyclic weighted graph 400 shown in FIG. 4) that encodes data types and semantic types used by a data set, as described in block 504. That is, the directed acyclic weighted graph is able to extract what type of data (e.g., string, fixed point, floating point, variable, etc.) is used in the data set as well as the data schema (e.g., data separated by commas, pipes, tabs, etc.).

As described in block 506, one or more processors then assign estimated frequencies for each component in the directed acyclic weighted graph. These estimated frequencies predict a likelihood of a particular data schema element being used by any data set. For example, assume that for data sets coming from a particular application, user, system, etc., node 410 and node 414 shown in FIG. 4 were appropriate only 5% of the time. That is, in only 5% of the data sets coming from that particular application, user, system, etc. were pipes or tabs used to separate data fields. However, data sets coming from that particular application, user, system, etc. used a CSV data schema 90% of the time. Thus, data sets coming from that particular application, user, system, etc. will initially be evaluated (in order to determine what schema they are using or should be using) by going through node 412. Thereafter, assume that for these 90% of data sets coming from that particular application, user, system, etc., 95% had a variable string as the first value in the n-tuples that make up the data sets (see edge 416 in FIG. 4), 98% thereafter had a fixed integer as the next value in the n-tuples (see edge 418 in FIG. 4), and 99% thereafter had a floating point integer as the final value in the n-tuples (see edge 420 in FIG. 4). These percentages (90%, 95%, 98%, and 99%) are used as weights for the nodes/edges, in order to determine the likelihood of their being appropriate data schema descriptors for data sets coming from this particular application, user, system, etc.

Returning to FIG. 5 and as depicted in block 508, one or more processors then traverse through paths in the directed acyclic weighted graph with a predetermined portion of the data set to determine a schema that correctly defines data from the data set and identifies any errors in the data set. That is, some or all of the data set traverses through the directed acyclic weighted graph (which acts as a statistical transducer as described herein).

As depicted in block 510, one or more processors then apply the schema to the data set to generate clean data that is properly formatted (see FIG. 3). That is, once preliminary schema features are determined (e.g., separating elements by commas), then other schema features associated with a schema that uses commas (e.g., CSV) such as the use of quotation marks, etc. will also be applied to the data set.

The flow-chart ends at terminator block 512.

In one embodiment of the present invention, one or more processors traverse through the paths in the directed acyclic weighted graph with the predetermined portion of the data set to determine alternative schemas that define data from the data set in a manner that is less precise than the schema that correctly defined the data from the data set. For example, in FIG. 4, assume that part of a data set actually used pipe separators. In this example, pathway 422 could be used to identify an alternative data schema, even though it might not be as accurate (appropriate for a particular type of data set). While this intuitively may not sound useful, it actually is very useful if applied to a high volume of data sets. That is, even if derived data schema may appear to be inappropriate for certain classes of data sets, these derived data schema nonetheless may be useful in 1) evaluating the features of all of the data sets, and/or for 2) identifying errors (e.g., typographical mistakes) found in the data sets.

In one embodiment of the present invention, one or more processors prune out pathways in the directed acyclic weighted graph according to predefined low levels of historical success rates. That is, if certain pathways are rarely used, then they are removed from the directed acyclic weighted graph 400 shown in FIG. 4.

In one embodiment of the present invention, one or more processors receive feedback from an application that consumes the data set. This feedback describes any errors found from usage of the one or more schemas that are determined by traversing through the paths in the directed acyclic weighted graph. For example, if a downstream consumer of the "clean" data set used a CSV data format on the "clean" data set, but the system "crashed" due to problems with trying to use the CSV data format, a report of this problem would be sent back to the STS 204 in FIG. 2, alerting it that there is a problem with the use of CSV data formats for this type of data set.

In one embodiment of the present invention, one or more processors execute a Generalized Left to Right (GLR) parser against the data set to build and populate nodes in the directed acyclic weighted graph, as described above.

The present invention may be implemented using cloud computing, as now described. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
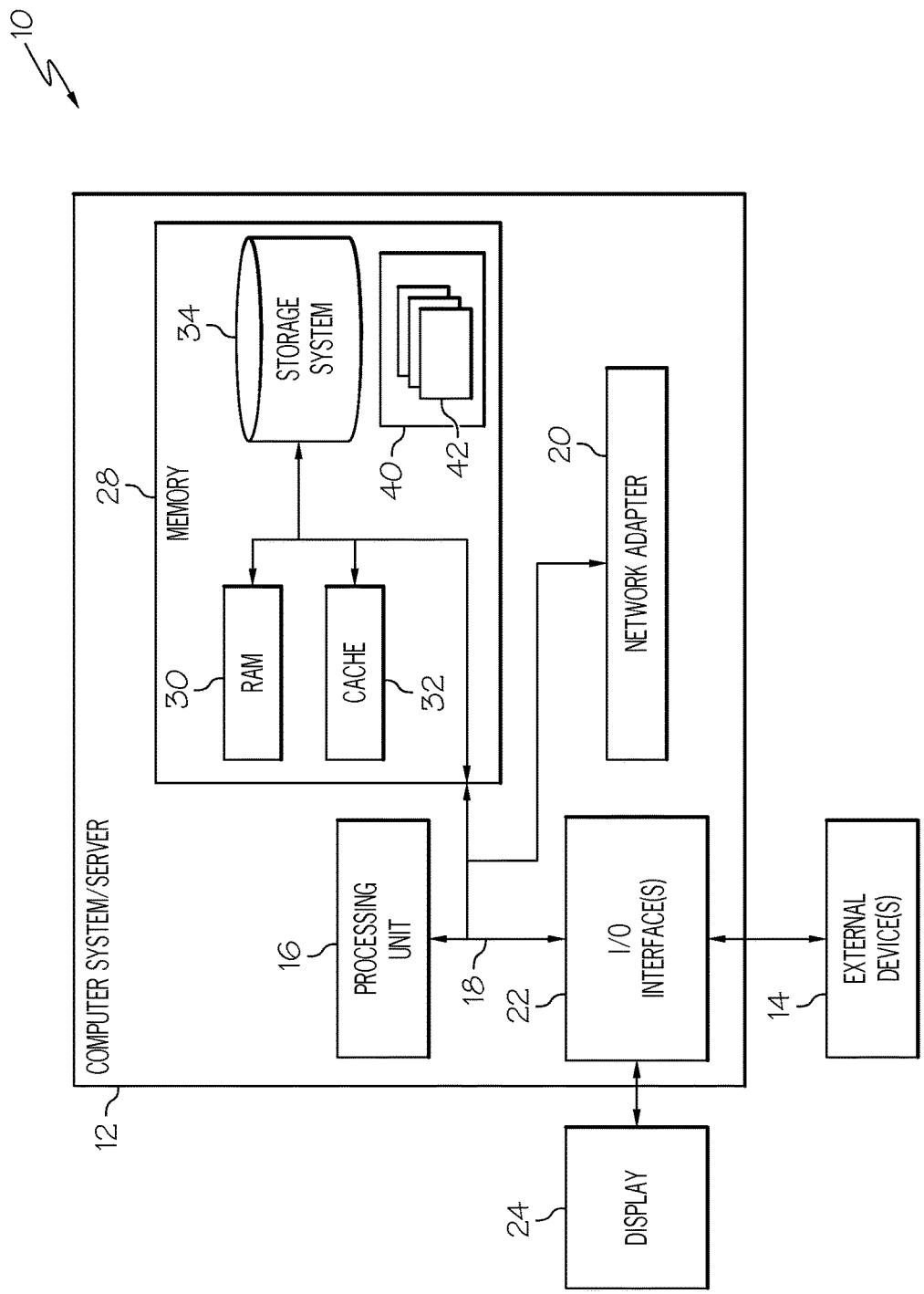
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
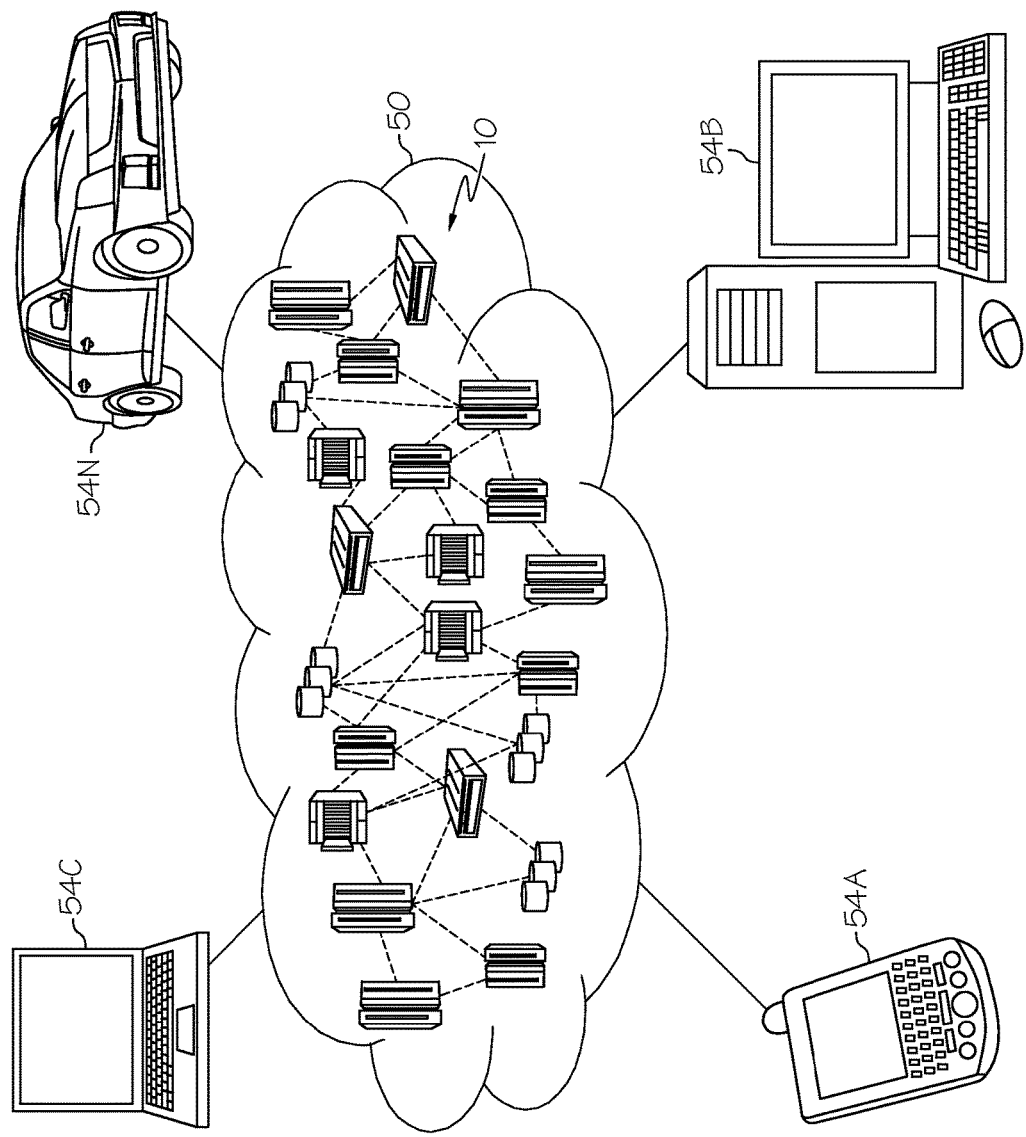
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
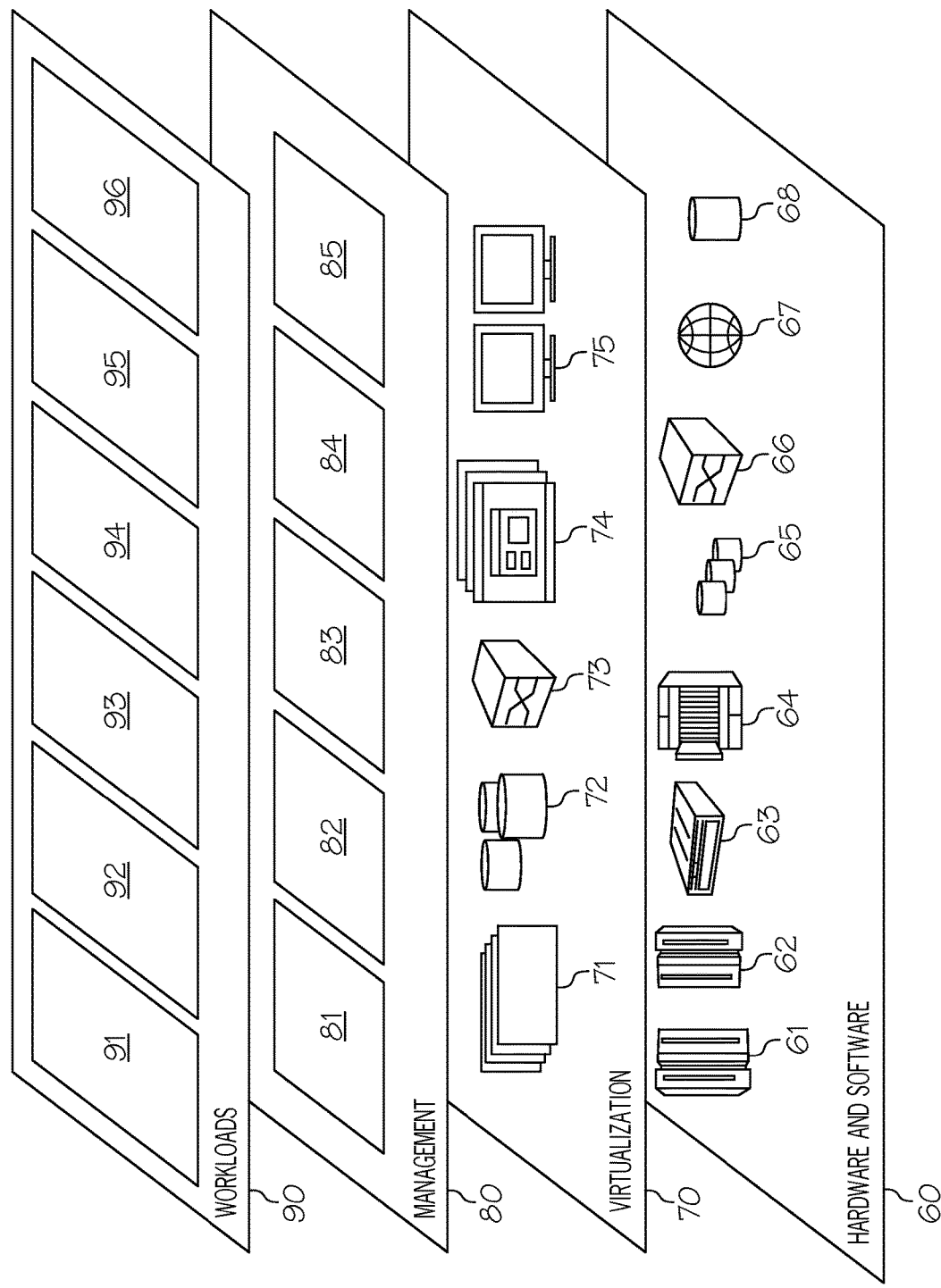
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and schema discovery processing 96 (for discovering data set schemas through statistical transduction as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A schema transduction system (STS) based method comprising:
    generating, by one or more processors, a directed acyclic weighted graph that encodes data types and semantic types used by a data set, wherein the data types are from a group consisting of string data, fixed point data, floating point data, and variable data, and wherein the semantic types describe a data schema used by data, wherein the data schema describes a character that is used to separate an individual datum from other data within a group of data;
    assigning, by one or more processors, estimated frequencies for each component of the directed acyclic weighted graph, wherein the estimated frequencies describe a likelihood of a particular data schema element being used by any data set, wherein said each component of the directed acyclic weighted graph is a node or an edge in the directed acyclic weighted graph, and wherein nodes describe the data schema and edges describe the data types;
    traversing, by one or more processors, through paths in the directed acyclic weighted graph with a predetermined portion of the data set to determine a data schema that correctly defines data from the data set and identifies any errors in the data set;
    determining, by one or more processors, that a particular data schema described in a top node in the directed acyclic weighted graph is used more than a first predetermined percentage of instances by past data sets that are output from a particular application;
    determining, by one or more processors, that a particular data type described in a lower edge below the top node is used more than a second predetermined percentage of instances by the past data sets that are output from the particular application, wherein the particular data type described in the lower edge is used with the particular data schema described in the top node, and wherein the second predetermined percentage of instances is higher than the first predetermined percentage of instances;
    determining, by one or more processors, an appropriate data schema descriptor for an n-tuple of data based on the first predetermined percentage of instances by past data sets and the second predetermined percentage of instances by the past data sets that are output from the particular application;
    applying, by one or more processors implementing the STS, the appropriate data schema descriptor for the n-tuple of data to the new data set in order to generate clean data that is properly formatted; and
    utilizing, by a security system for an electronic customer database, the clean data as an alarm code, wherein the alarm code instructs the security system to prevent a particular customer's data from being shared by the electronic customer database.

2. The method of claim 1, further comprising:
    traversing, by one or more processors, through the paths in the directed acyclic weighted graph with the predetermined portion of the data set to determine alternative data schemas that define data from the data set in a manner that is less precise than the data schema that correctly defined the data from the data set.

3. The method of claim 1, wherein the predetermined portion of the data set is all of the data set.

4. The method of claim 1, wherein the predetermined portion is a partial portion of the data set.

5. The method of claim 1, further comprising:
    pruning out, by one or more processors, pathways in the directed acyclic weighted graph according to predefined low levels of historical success rates.

6. The method of claim 1, further comprising:
    receiving, by one or more processors, a feedback from an application that consumes the data set, wherein the feedback describes any errors found from usage of the one or more data schemas that are determined by traversing through the paths in the directed acyclic weighted graph.

7. The method of claim 1, further comprising:
    executing, by one or more processors, a generalized left to right (GLR) parser against the data set to build and populate nodes in the directed acyclic weighted graph.

8. A computer program product, the computer program product comprising a non-transitory computer readable storage medium having program code embodied therewith, the program code readable and executable by a processor to perform a method comprising:
    generating a directed acyclic weighted graph that encodes data types and semantic types used by a data set, wherein the data types are from a group consisting of string data, fixed point data, floating point data, and variable data, and wherein the semantic types describe a data schema used by data, wherein the data schema describes a character that is used to separate an individual datum from other data within a group of data;
    assigning estimated frequencies for each component of the directed acyclic weighted graph, wherein the estimated frequencies describe a likelihood of a particular data schema element being used by any data set, wherein said each component of the directed acyclic weighted graph is a node or an edge in the directed acyclic weighted graph, and wherein nodes describe the data schema and edges describe the data types;
    traversing through paths in the directed acyclic weighted graph with a predetermined portion of the data set to determine a data schema that correctly defines data from the data set and identifies any errors in the data set;
    determining that a particular data schema described in a top node in the directed acyclic weighted graph is used more than a first predetermined percentage of instances by past data sets that are output from a particular application;

determining that a particular data type described in a lower edge below the top node is used more than a second predetermined percentage of instances by the past data sets that are output from the particular application, wherein the particular data type described in the lower edge is used with the particular data schema described in the top node, and wherein the second predetermined percentage of instances is higher than the first predetermined percentage of instances;

determining an appropriate data schema descriptor for an n-tuple of data based on the first predetermined percentage of instances by past data sets and the second predetermined percentage of instances by the past data sets that are output from the particular application;

applying, by a schema transduction system (STS), the appropriate data schema descriptor for the n-tuple of data to the new data set in order to generate clean data that is properly formatted; and utilizing, by a security system for an electronic customer database, the clean data as an alarm code, wherein the alarm code instructs the security system to prevent a particular customer's data from being shared by the electronic customer database.

9. The computer program product of claim 8, wherein the method further comprises:

traversing through the paths in the directed acyclic weighted graph with the predetermined portion of the data set to determine alternative data schemas that define data from the data set in a manner that is less precise than the data schema that correctly defined the data from the data set.

10. The computer program product of claim 8, wherein the predetermined portion of the data set is all of the data set.

11. The computer program product of claim 8, wherein the method further comprises:

pruning out pathways in the directed acyclic weighted graph according to predefined low levels of historical success rates.

12. The computer program product of claim 8, wherein the method further comprises:

receiving a feedback from an application that consumes the data set, wherein the feedback describes any errors found from usage of the one or more data schemas that are determined by traversing through the paths in the directed acyclic weighted graph.

13. The STS based method of claim 1, wherein generating the clean data corrects any typographical errors in the data set.

14. A computer system comprising:

a processor, a computer readable memory, and a non-transitory computer readable storage medium;

first program instructions to generate a directed acyclic weighted graph that encodes data types and semantic types used by a data set, wherein the data types are from a group consisting of string data, fixed point data, floating point data, and variable data, and wherein the semantic types describe a data schema used by data, wherein the data schema describes a character that is used to separate an individual datum from other data within a group of data;

second program instructions to assign estimated frequencies for each component of the directed acyclic weighted graph, wherein the estimated frequencies describe a likelihood of a particular data schema element being used by any data set, wherein said each component of the directed acyclic weighted graph is a node or an edge in the directed acyclic weighted graph, and wherein nodes describe the data schema and edges describe the data types;

third program instructions to traverse through paths in the directed acyclic weighted graph with a predetermined portion of the data set to determine a data schema that correctly defines data from the data set and identifies any errors in the data set;

fourth program instructions to determine that a particular data schema described in a top node in the directed acyclic weighted graph is used more than a first predetermined percentage of instances by past data sets that are output from a particular application;

fifth program instructions to determine that a particular data type described in a lower edge below the top node is used more than a second predetermined percentage of instances by the past data sets that are output from the particular application, wherein the particular data type described in the lower edge is used with the particular data schema described in the top node, and wherein the second predetermined percentage of instances is higher than the first predetermined percentage of instances;

sixth program instructions to determine an appropriate data schema descriptor for an n-tuple of data based on the first predetermined percentage of instances by past data sets and the second predetermined percentage of instances by the past data sets that are output from the particular application;

seventh program instructions to apply, by a schema transduction system (STS), the appropriate data schema descriptor for the n-tuple of data to the new data set in order to generate clean data that is properly formatted; and eighth program instructions to utilize, by a security system for an electronic customer database, the clean data as an alarm code, wherein the alarm code instructs the security system to prevent a particular customer's data from being shared by the electronic customer database; and wherein the first, second, third, fourth, fifth, sixth, seventh, and eighth program instructions are stored on the non-transitory computer readable storage medium for execution by one or more processors via the computer readable memory.

15. The STS based method of claim 1, wherein the character that is used to separate the individual datum from the other data within the group of data is from a group of character separators consisting of a comma, a pipe and a tab.

16. The computer system of claim 14, further comprising:

ninth program instructions to receive a feedback from an application that consumes the data set, wherein the feedback describes any errors found from usage of the one or more data schemas that are determined by traversing through the paths in the directed acyclic weighted graph; and wherein the ninth program instructions are stored on the non-transitory computer readable storage medium for execution by one or more processors via the computer readable memory.

* * * * *